(12) United States Patent
Triscari

(10) Patent No.: US 9,457,829 B2
(45) Date of Patent: Oct. 4, 2016

(54) CONVERTIBLE ICE FISHING SLED SHELTER

(71) Applicant: Nicholas Joseph Triscari, Franklin, WI (US)

(72) Inventor: Nicholas Joseph Triscari, Franklin, WI (US)

( * ) Notice: Subject to any disclaimer, the term of this patent is extended or adjusted under 35 U.S.C. 154(b) by 0 days.

(21) Appl. No.: 14/983,977

(22) Filed: Dec. 30, 2015

(65) Prior Publication Data

US 2016/0200342 A1    Jul. 14, 2016

Related U.S. Application Data

(60) Provisional application No. 62/101,117, filed on Jan. 8, 2015.

(51) Int. Cl.
*B62B 13/16* (2006.01)
*B62B 13/04* (2006.01)

(52) U.S. Cl.
CPC ............. *B62B 13/16* (2013.01); *B62B 13/043* (2013.01)

(58) Field of Classification Search
CPC . B62B 13/043; B62B 13/16; B62B 2205/00; B62B 2205/26; B62B 2206/00; B62B 2206/006; E04H 15/001; E04H 15/06; E04H 15/30; E04H 15/48
USPC ................... 280/18, 19, 19.1, 28.13
See application file for complete search history.

(56) References Cited

U.S. PATENT DOCUMENTS

| | | | | |
|---|---|---|---|---|
| 3,017,194 A | * | 1/1962 | Anderson | A01K 97/22 135/901 |
| 3,436,119 A | * | 4/1969 | Lehmann | A01K 97/01 280/19.1 |
| 4,526,391 A | * | 7/1985 | Winkelman | E04H 1/1205 135/87 |
| 4,683,672 A | * | 8/1987 | Davis | A01M 31/025 135/901 |
| 7,959,182 B2 | * | 6/2011 | Klein | A01K 97/01 280/47.18 |
| 2006/0181038 A1 | * | 8/2006 | Walter | B62B 5/0013 280/19.1 |
| 2015/0068572 A1 | * | 3/2015 | Hatfield | E04H 15/48 135/143 |

* cited by examiner

*Primary Examiner* — John Walters

(57) ABSTRACT

The Convertible Ice Fishing Sled Shelter provides the user with a stable and easy to pull utility ice fishing sled that converts into an easy set up single person shelter. The A frame design ensures a stable structure even in windy conditions. The shelter protects the occupant from wind, snow, and rain on three sides and partially overhead. The single motion opening and closing design is unique to this invention. Furthermore, the sled shelter can be relocated in the open or closed position increasing the mobility of the user.

7 Claims, 4 Drawing Sheets

CONVERTIBLE ICE FISHING SLED SHELTER

BACKGROUND OF INVENTION

This invention relates to the sport of ice fishing. It combines the utility of a sled used to transport related fishing equipment and a single person shelter that protects the occupant from the elements.

BRIEF SUMMARY OF INVENTION

This invention converts a utility ice fishing sled into a one person shelter that comprises a seat and three weather protective sides. By standing the sled on end and extending the two front support legs, a seat and two weatherproof sides unfold in one easy motion. This invention increases the mobility of the user by solving the problem of prior art that requires complete or partial disassembly when relocating the shelter.

DESCRIPTION OF DRAWING VIEWS

Figure 1:
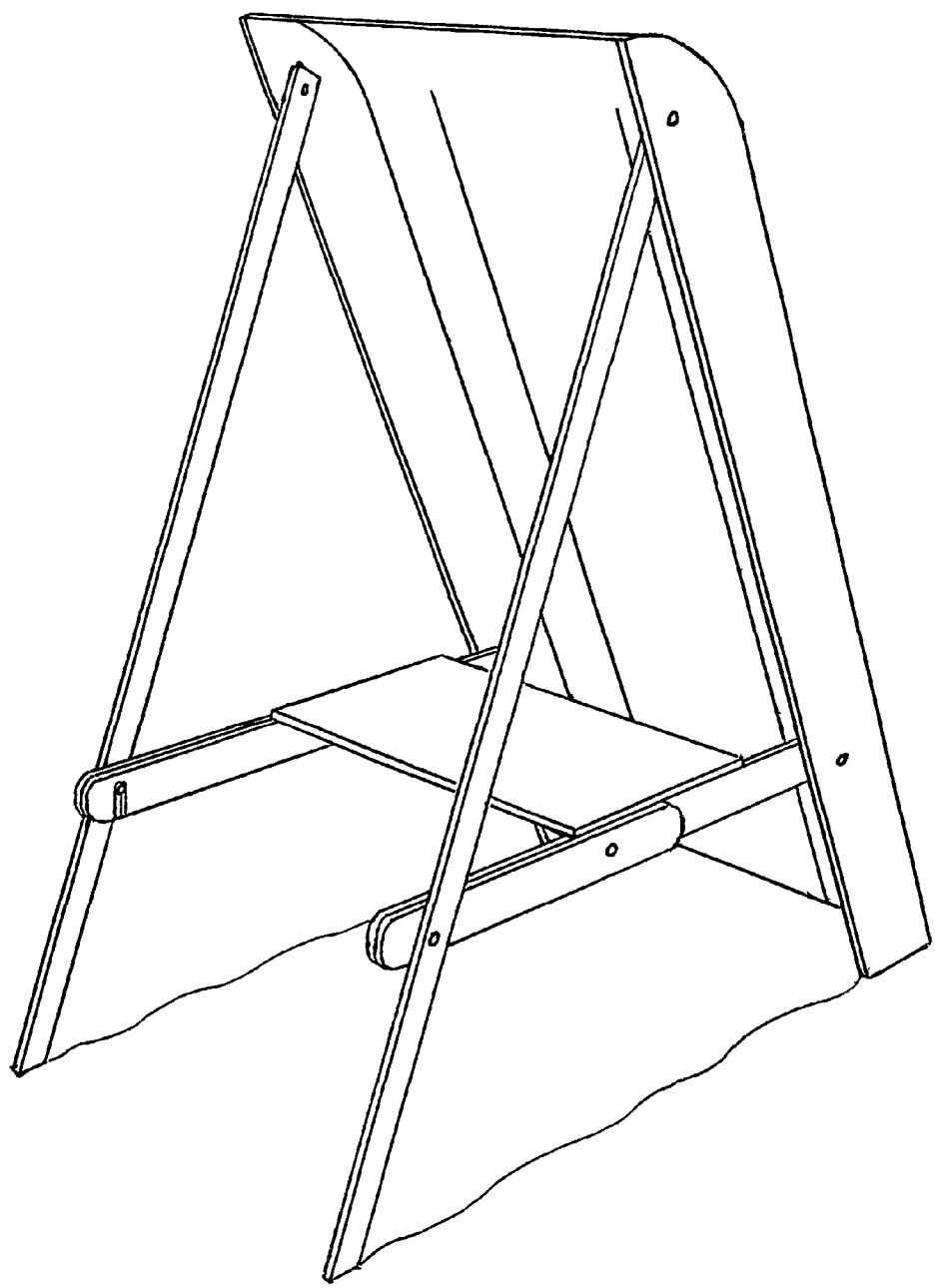
Figure 2:
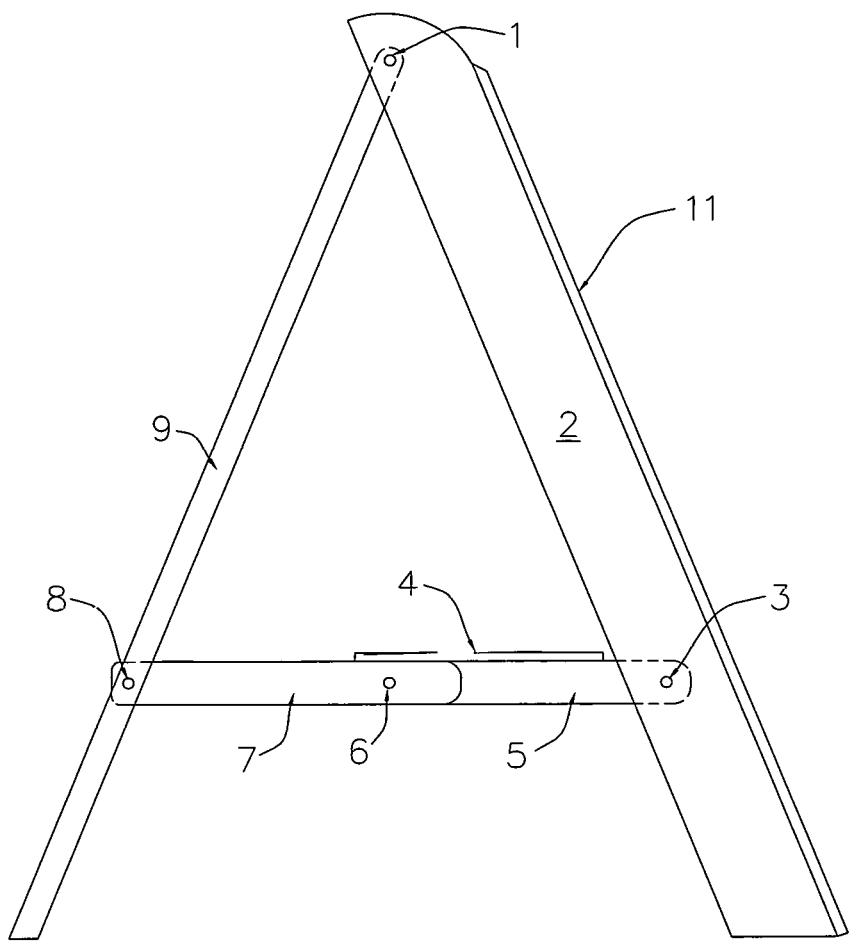
Figure 3:
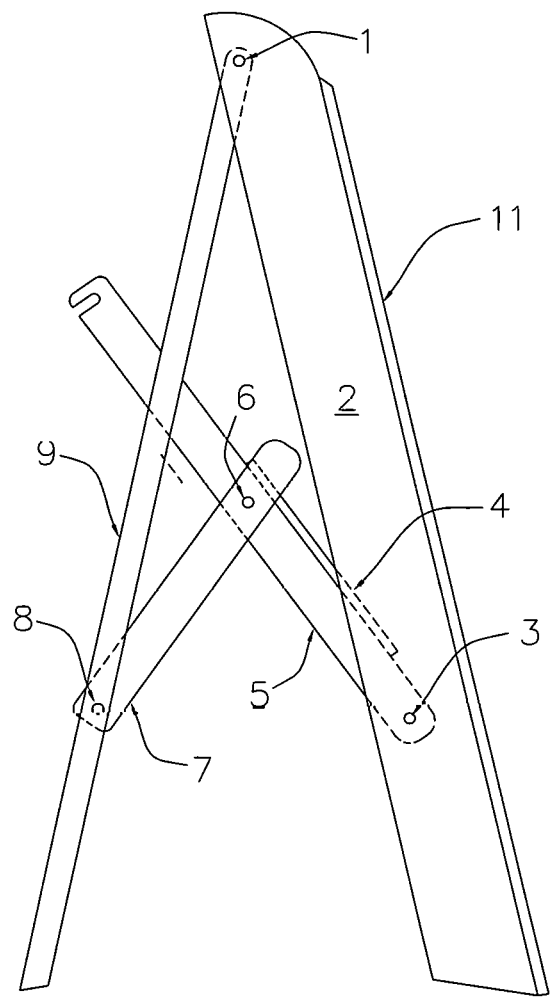
Figure 4:
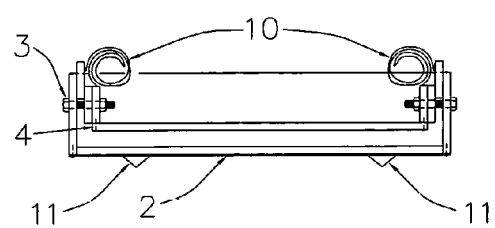
Figure 5:
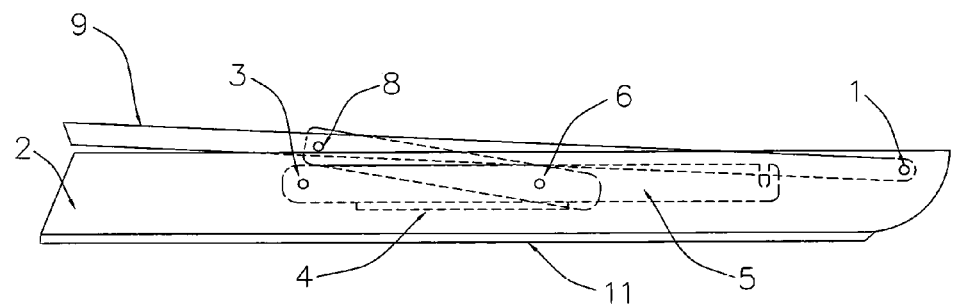

FIG. 1, Isometric View.
FIG. 2, Side View of open position.
FIG. 3, Side View of partially open/closed position.
FIG. 4, End View of closed position.
FIG. 5, Side View of closed position.

DETAILED DESCRIPTION

The sled has a closed bottom with integral runners, Item 11, for sliding stability and strength. The front pulling end is curved upward to facilitate easy movement through snow, (FIG. 5). The sled includes a pulling rope attached at two points at the curved end. The back end is beveled toward the front end at approximately twenty degrees, (FIG. 5), to allow the sled to form an A frame when in the open position, (FIG. 2).

The sled's two longitudinal sides, Item 2, are perpendicular to the bottom of the sled to facilitate the mounting of the two front support legs, Item 9; two support arms, Item 5; and two weather proof panels, (FIG. 1). The two weatherproof panels are attached to the front support legs, Item 9; and the longitudinal sides of the sled, Item 2; (FIG. 1). The weatherproof panels are flexible to allow for easy opening and closing and can be rolled up and secured with a flexible strap when the sled is in the closed position, (FIG. 4). The two front support legs, Item 9, are attached and pivot at point 1, (FIG. 2). The seat, Item 4, is attached to the two continuous support arms, Item 5, that are attached and pivot at point 3 and lock in place at point 8, (FIG. 2). The two linkage arms, Item 7, are attached and pivot at point 6 of the support arms, Item 5, and at point 8 of the support legs, Item 9, (FIG. 2). The opening and closing action is accomplished by pivot points 1, 3, 6, and 8, (FIG. 2). The sled converts into a shelter by moving either support arm, Item 5, until it locks in place at point 8 of the support leg, Item 9, (FIG. 3).

The invention claimed is:

1. A utility ice fishing sled that converts into a single person shelter comprising, an attached rectangular seat mounted to two support arms, two hinged support legs, two weatherproof sides panels, two linkage arms; wherein the sled when positioned vertically on a beveled end folds out into an open position providing a protective shelter by pulling downward on either support arms; wherein by pushing upward on either support arm folds the weatherproof sides toward the sled to form a closed position; wherein pulling downward or pushing upward on either support arm constitutes a single motion opening and closing action.

2. The utility ice fishing sled of claim 1 further comprises, multiple integral longitudinal runners for reinforcing and stability.

3. The utility ice fishing sled of claim 1 further comprises, a curved front profile that facilitates movement through snow and ice.

4. The utility ice fishing sled of claim 1 further comprises, a beveled end to support the sled when the sled is in an open position.

5. The utility ice fishing sled of claim 1 further comprises a rectangular seat mounted to two support arms; wherein the two support arms pivot and interlock with two support legs when the sled is in an open position.

6. The utility ice fishing sled of claim 1 further comprises, two linkage arms that pivot with the support legs and pivot with the support arms to facilitate a single motion opening and closing action.

7. The utility ice fishing sled of claim 1 further comprises, two weatherproof side panels composed of flexible water proof material that can be folded when the sled is in a closed position.

* * * * *